United States Patent
Christensen et al.

(10) Patent No.: US 8,332,082 B2
(45) Date of Patent: Dec. 11, 2012

(54) FLIGHT CONTROL LAWS FOR CONSTANT VECTOR FLAT TURNS

(75) Inventors: Kevin Thomas Christensen, Plano, TX (US); Shyhpyng Jack Shue, Grapevine, TX (US); Troy Sheldon Caudill, Burleson, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 13/391,522

(22) PCT Filed: Mar. 30, 2011

(86) PCT No.: PCT/US2011/030498
§ 371 (c)(1),
(2), (4) Date: Feb. 21, 2012

(65) Prior Publication Data
US 2012/0253558 A1 Oct. 4, 2012

(51) Int. Cl.
*G05D 1/08* (2006.01)
*G06F 7/00* (2006.01)

(52) U.S. Cl. .................. 701/3; 701/4; 701/14; 244/180; 340/979

(58) Field of Classification Search .................. 701/3, 4, 701/7, 10, 14; 340/979; 244/180, 181, 197, 244/230
See application file for complete search history.

(56) References Cited

U.S. PATENT DOCUMENTS

| | | | |
|---|---|---|---|
| 2003/0191561 A1 | 10/2003 | Vos | |
| 2006/0186261 A1* | 8/2006 | Unzicker | 244/12.1 |
| 2008/0234881 A1* | 9/2008 | Cherepinsky et al. | 701/7 |
| 2010/0308178 A1* | 12/2010 | Gemmati et al. | 244/230 |

FOREIGN PATENT DOCUMENTS
WO     2007018572 A2    2/2007

OTHER PUBLICATIONS

International Search Report and the Written Opinion of the International Searching Authority mailed by ISA/USA, U.S. Patent and Trademark Office on Aug. 26, 2011 for corresponding International Patent Application No. PCT/US2011/030498, 7 pages.

* cited by examiner

*Primary Examiner* — Tan Q Nguyen
(74) *Attorney, Agent, or Firm* — James E. Walton; Richard G. Eldredge

(57) ABSTRACT

An aircraft and method to control flat yawing turns of the aircraft while maintaining a constant vector across a ground surface. The aircraft includes a control system in data communication with control actuators, a lateral control architecture, a longitudinal control architecture, and an initialization command logic. The lateral control architecture controls the aircraft in the lateral direction, while the longitudinal control architecture controls the aircraft in the longitudinal direction. The initialization command logic automatically activates the lateral control architecture and the longitudinal control architecture to maintain a constant vector across the ground whenever a directional control input is made at low speed.

20 Claims, 9 Drawing Sheets

FLIGHT CONTROL LAWS FOR CONSTANT VECTOR FLAT TURNS

TECHNICAL FIELD

The present invention relates generally to flight control systems, and more particularly, to a flight control system having flight control laws which enable precise aircraft maneuvering relative to the ground.

DESCRIPTION OF THE PRIOR ART

Aircraft which can hover and fly at low speeds include rotorcraft, such as helicopters and tilt rotors, and jump jets, like the AV-8B Harrier and F-35B Lightning II. These aircraft can spend a large portion of their mission maneuvering relative to the ground. Sometimes, this maneuvering must be conducted in confined spaces around external hazards such as buildings, trees, towers, and power lines.

For traditional flight control systems, ground-referenced maneuvering (GRM) requires the pilot to make constant control inputs in multiple axes in order to counter disturbances caused by wind, as well as to remove the natural coupled response of the aircraft. The pilot workload during such maneuvers can become quite high since the pilot must sense un-commanded aircraft motions and then put in the appropriate control input to eliminate the disturbance. In a worst-case scenario, a pilot might be required to fly GRM in a degraded visual environment. With the lack of visual cues to detect off-axis motion, the pilot might accidentally fly into an external hazard while maneuvering in a confined space.

Traditional flight control law designs do not provide the pilot with an easy way to control aircraft crab angle during GRM. Crab angle is defined as the angle between the aircraft's heading and its actual ground path. With these prior designs, adjusting crab angle while maintaining ground track took considerable pilot concentration, since the pilot had to coordinate inputs to both the lateral and directional controllers.

Although pilots generally seek to minimize crab angle during GRM, some mission tasks may call for flat yawing turns while maintaining a constant vector across the ground. For example, on a steep approach, the pilot may need to fly with a crab angle so he or she can see the landing zone. Additionally, the pilot may want to quickly transition out of rearward or sideward flight while continuing along the same ground track. In a final example, the pilot may want to acquire and track a point on the ground without having to fly directly towards it. With prior flight control designs, such maneuvers required extraordinary pilot skill to coordinate the aircraft's motions in multiple control axes.

Although the foregoing developments represent great strides in the area of flight control laws, many shortcomings remain.

BRIEF DESCRIPTION OF THE DRAWINGS

The novel features believed characteristic of the application are set forth in the appended claims. However, the application itself, as well as a preferred mode of use, and further objectives and advantages thereof, will best be understood with reference to the following detailed description when read in conjunction with the accompanying drawings, wherein:

Figure 1:
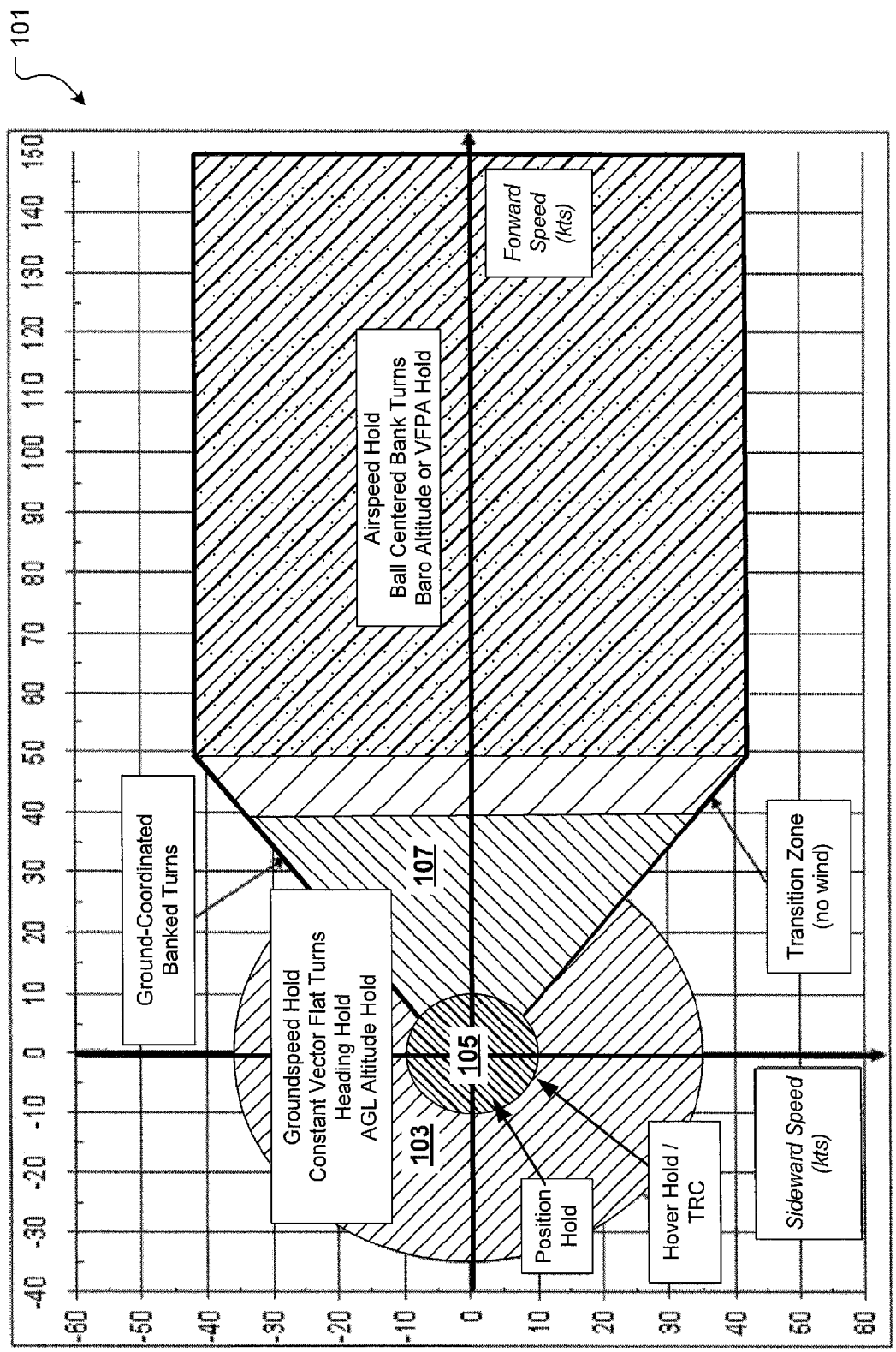
FIG. 1 is a flight envelope with control law modes designed to enable ground reference maneuvers.

While the control system of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DESCRIPTION OF THE PREFERRED EMBODIMENT

This invention will enable seamless and transient free GRM. More specifically this invention will enable a pilot to use the directional controller to command flat yawing turns at low groundspeeds, while maintaining a constant vector across the ground. The seamless integration of this design requires no manual cockpit switches to select a Constant Vector Flat Turn (CVFT) mode. As a result of this auto-moding logic, the control laws will automatically adjust pitch and roll attitude to keep the aircraft moving in the same direction at a constant speed whenever the pilot inputs a directional command at low speed.

The auto-moding logic of the present application enables seamless and transient free GRM without the need for manual cockpit switches. The control system utilizes relative groundspeed difference to automatically control pitch and roll attitudes so that the aircraft will maintain a constant vector during a low speed flat turn. The control system also allows the pilot to complete a CVFT with minimal workload since the ground vector will automatically be maintained by the control laws without the pilot having to use cockpit switches to change modes.

Referring now to the drawings, FIG. 1 shows a representative flight envelope 101 with a plurality of control law modes designed to enable GRM. Flight envelope 101 comprises a region 103 depicting the CVFT region, wherein the CVFT region is preferably from 10 to 35 knots groundspeed in any direction relative to the aircraft's body axis. The lower bound of region 103 is set by the Hover Hold and Translational Rate Command (TRC) region 105. The upper bound of region 103 is set by the aircraft's sideward and rearward flight airspeed limits.

Figure 2:
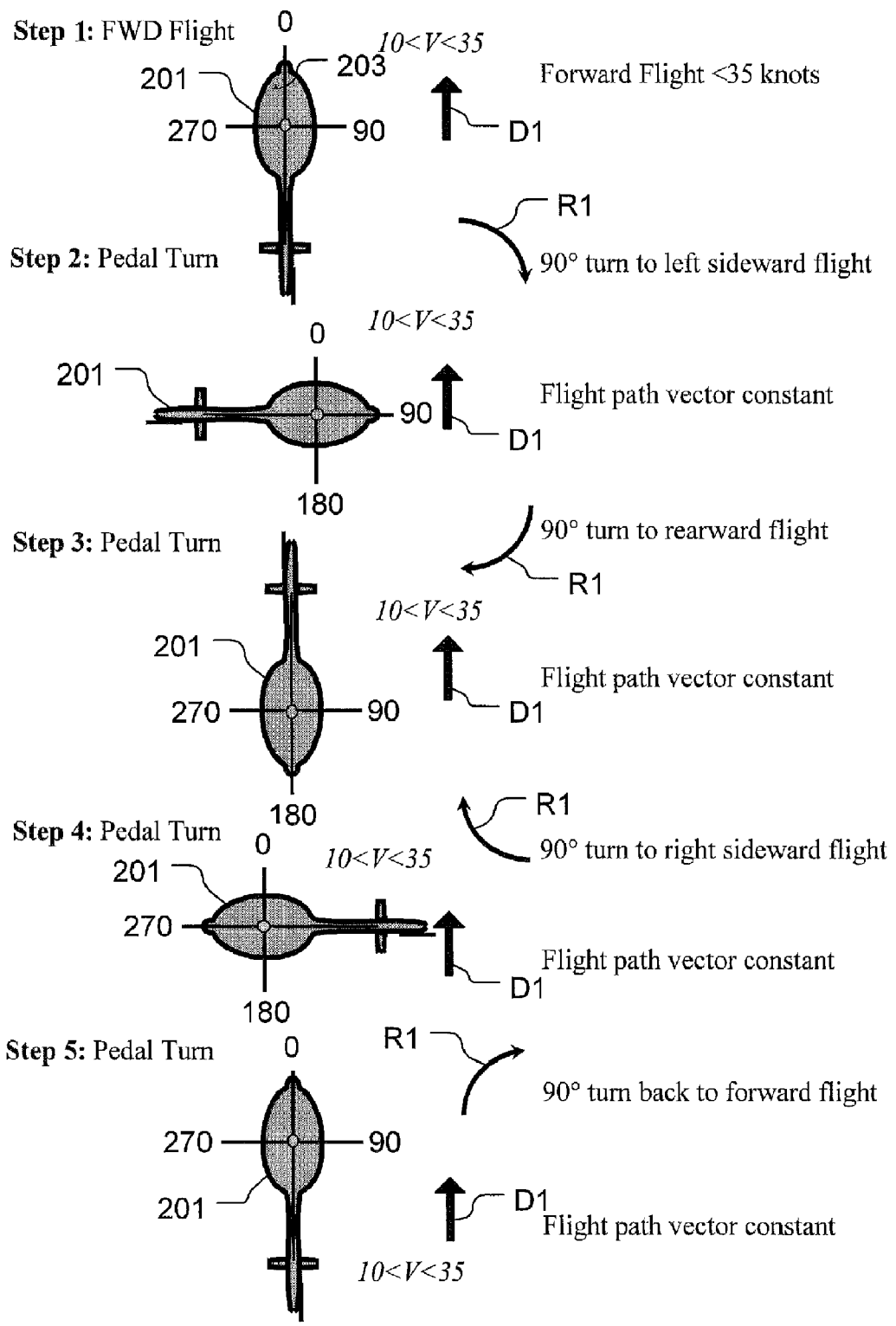
FIG. 2 is a schematic of an aircraft utilizing a control system according to the preferred embodiment of the present invention.

FIG. 2 is a schematic of an aircraft 201 utilizing a control system according to the preferred embodiment of the present invention. FIG. 2 shows aircraft 201 in forward flight within region 103. Directional inputs turn aircraft 201 in a complete 360 degree yaw movement R1, stopping every 90 degrees, and without changing the speed and flight heading of aircraft 201, as represented with arrow D1. In the preferred embodiment, the control system is utilized with rotary aircraft, i.e., a helicopter; however, it should be appreciated that the control system is easily and readily adaptable with control systems of different types of aircraft, both manned and unmanned.

FIG. 2 depicts aircraft 201 traveling between 10 to 35 knots in a forward direction. As is shown, aircraft 201 preferably turns in a yaw direction R1 at approximately 90 degrees relative to direction D1. Aircraft 201 continues to turn in direction R1 while maintaining a constant flight heading. It should be appreciated that the preferred control system is adapted to turn aircraft 201 at 90 degrees during each application; however, it should be appreciated that alternative embodiments could easily include a control system adapted to turn the aircraft at different angles, e.g., at 30 degrees in lieu of or in addition to 90 degrees. It should also be understood that although shown turning in a clockwise direction, the control system can also turn the aircraft in a counterclockwise movement.

FIG. 2 provides an exemplary depiction of aircraft 201 turning 360 degrees while maintaining forward flight. Step 1 shows aircraft 201 traveling in a constant forward flight, as depicted with arrow D1, between 10 and 35 knots. Step 2 depicts application of the control system, namely, the pilot utilizes the control system to rotate aircraft 201 in the clockwise direction approximately 90 degrees, as indicated by arrow R1. Step 2 shows aircraft 201 traveling in forward flight while the fuselage faces 90 degrees relative to the directional movement. Steps 3-5 provide further illustration of the process being repeated. In particular, each time the control system is utilized, aircraft 201 rotates 90 degrees while maintaining a constant forward heading.

Figure 3:
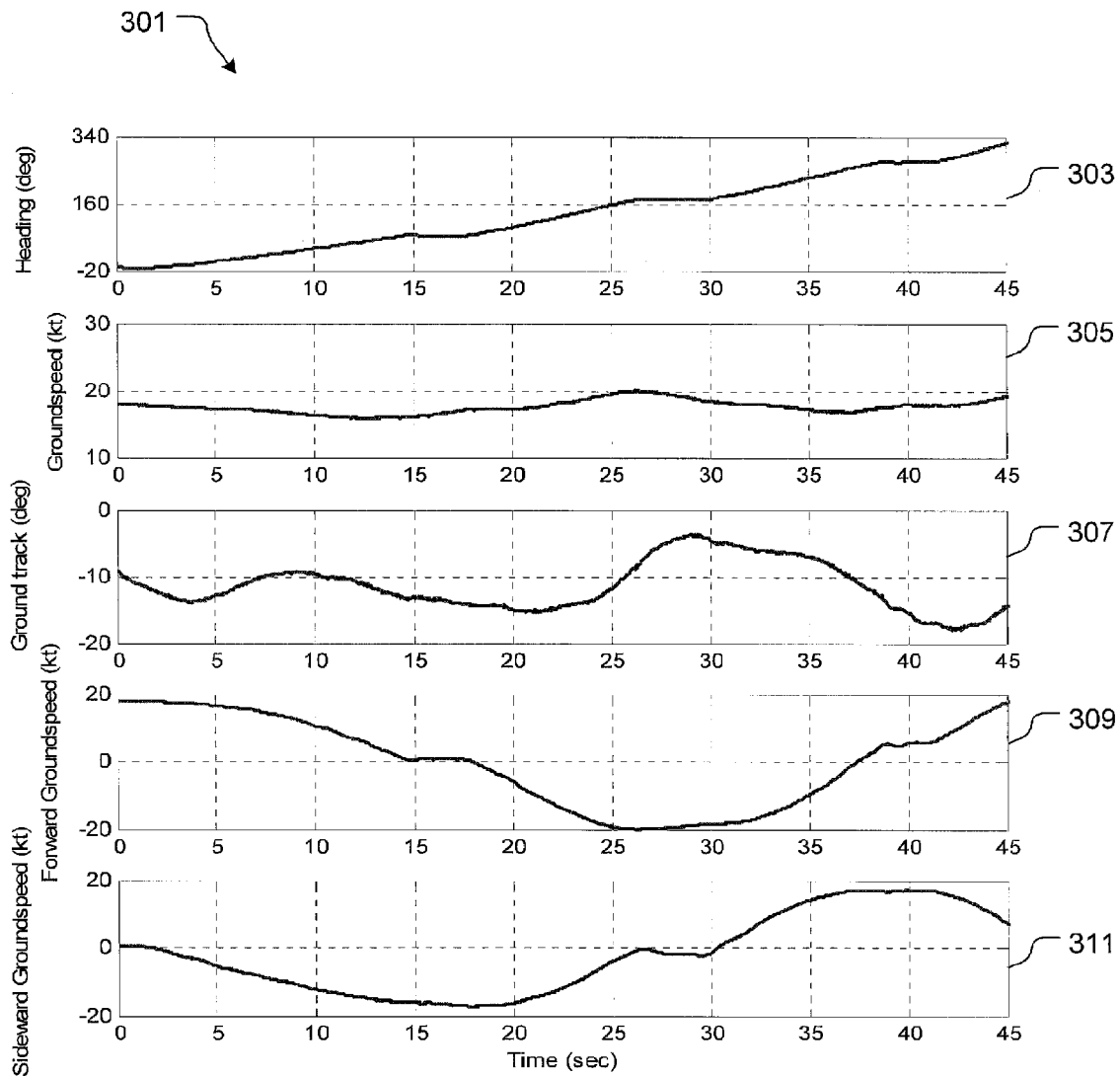
FIG. 3 is a set of plots comprising measured flight data of the aircraft of FIG. 2 while performing constant vector flat turns.

Referring now to FIG. 3 in the drawings, measured flight data 301 of aircraft 201 is shown during a 360 degree CVFT. A plot 303 provides measured data representing the turning movement R1 of aircraft 201 during the 360 degree turn. A plot 305 provides measured data representing the groundspeed of aircraft 201 during the 360 degree turn. Plot 305 shows aircraft 201 initially starting at 20 knots forward groundspeed during the entire 360 degree CVFT. Plot 305 shows that aircraft 201 holds a relatively steady groundspeed during the 360 degree CVFT. A plot 307 provides measured data representing the ground track of aircraft 201 during the 360 degree CVFT. The forward groundspeed plotted on a plot 309 essentially depicts a cosine curve during the turn, while the sideward groundspeed plotted on a plot 311 shows a sine curve.

Figure 4:
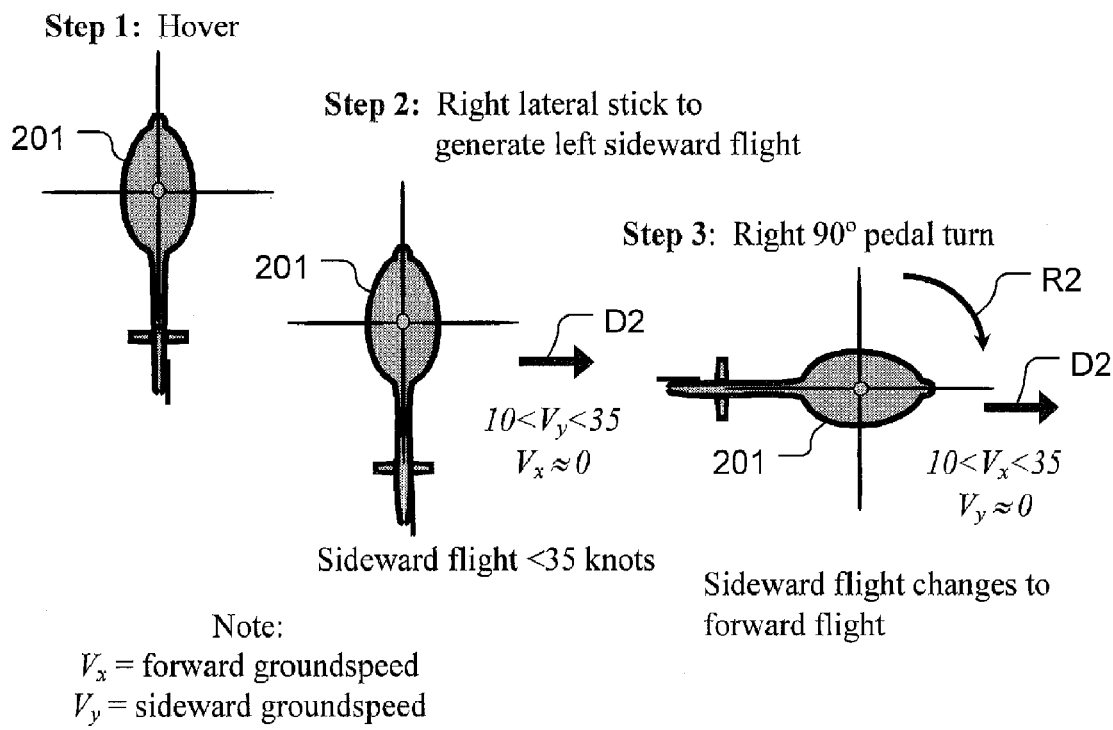
FIG. 4 is a schematic view of the aircraft of FIG. 2 changing flight heading from sideward flight to forward flight.

Referring now to FIG. 4 in the drawings, a schematic view of aircraft 201 is shown changing flight heading from sideward flight to forward flight. In the exemplary embodiment, the CVFT control system is utilized such that aircraft 201 changes heading from a forward groundspeed Vx of about 0 knots and a sideward groundspeed between 10-35 knots to a forward groundspeed between 10-35 knots and a sideward groundspeed about 0 knots. Step 1 of FIG. 4 shows aircraft 401 during hover, while a step 2 shows aircraft 401 traveling in a sideward groundspeed between 10-35 knots, as depicted with arrow D2. In step 2, a right lateral control stick (not shown) is utilized to generate a left sideward heading. Thereafter, a right 90 degree pedal turn is applied to rotate aircraft 201 in a forward heading with a pedal 203. In the preferred embodiment, pedal 203 is a pedal manipulated with the pilot's foot; however, it should be appreciated that other forms of devices, i.e, a hand switch could be utilized in lieu of or in addition to pedal 203. For purposes of this invention, a lateral controller, longitudinal controller, and directional controller are characterized as pedal 203 or similarly suited devices. Step 3 depicts application of the CVFT control system, wherein aircraft 201 turns 90 degrees for changing the heading of aircraft 201.

Figure 5:
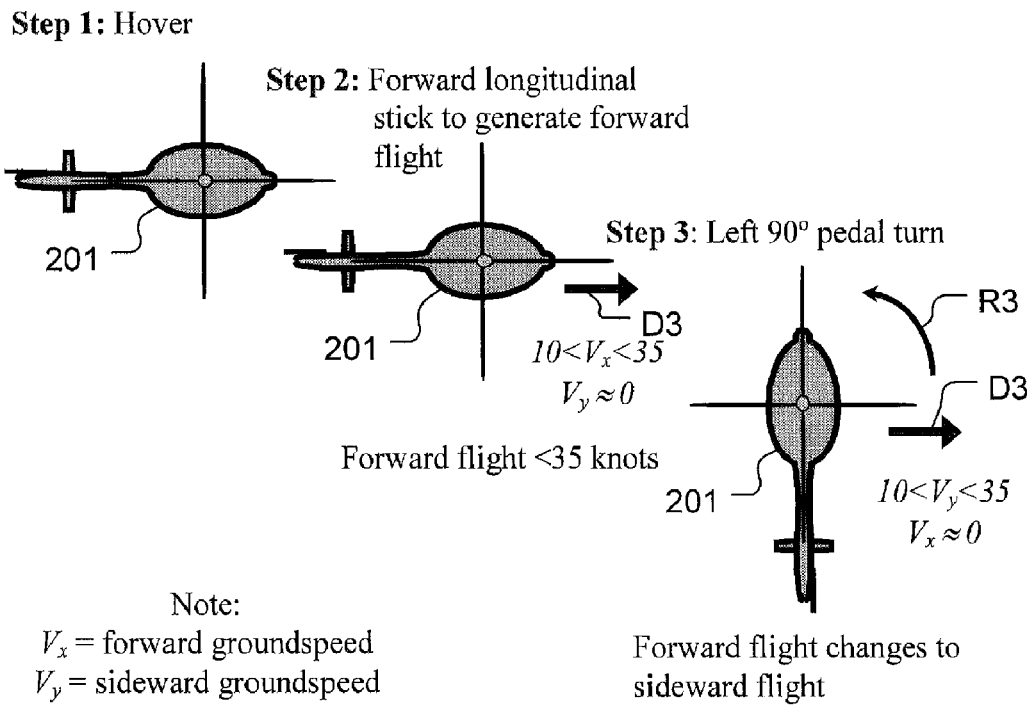
FIG. 5 is a schematic view of the aircraft of FIG. 2 changing flight heading from forward flight to sideward flight.

Referring now to FIG. 5 in the drawings, an alternative application of the CVFT control system is shown. In the exemplary embodiment, the CVFT control system is utilized to turn aircraft 201 from a forward groundspeed Vx between 10-35 knots and a sideward groundspeed of about 0 knots to a sideward groundspeed between 10-35 knots and a forward groundspeed about 0 knots. Step 1 shows aircraft 201 during hover, while a step 2 shows aircraft 201 traveling in a forward heading having a groundspeed between 10-35 knots, as depicted with arrow D3. In step 2, a forward longitudinal stick is utilized to generate forward flight. Thereafter, a left 90 degree pedal turn is applied to rotate aircraft 201 such that the forward flight of aircraft 201 changes to a sideward flight heading.

Those skilled in the art will understand that the methods for aircraft guidance disclosed in this invention can be applied to any combination of the following: (1) full authority fly-by-wire flight control systems, as well as partial authority mechanical systems; (2) traditional cockpit layouts with a center stick for longitudinal and lateral control, pedals for directional control, and a collective stick for vertical control, as well as more advanced designs which combine multiple control axes into a center or side stick controller; and, (3) any aircraft capable of GRM, including both rotorcraft and jump jets.

Figure 6:
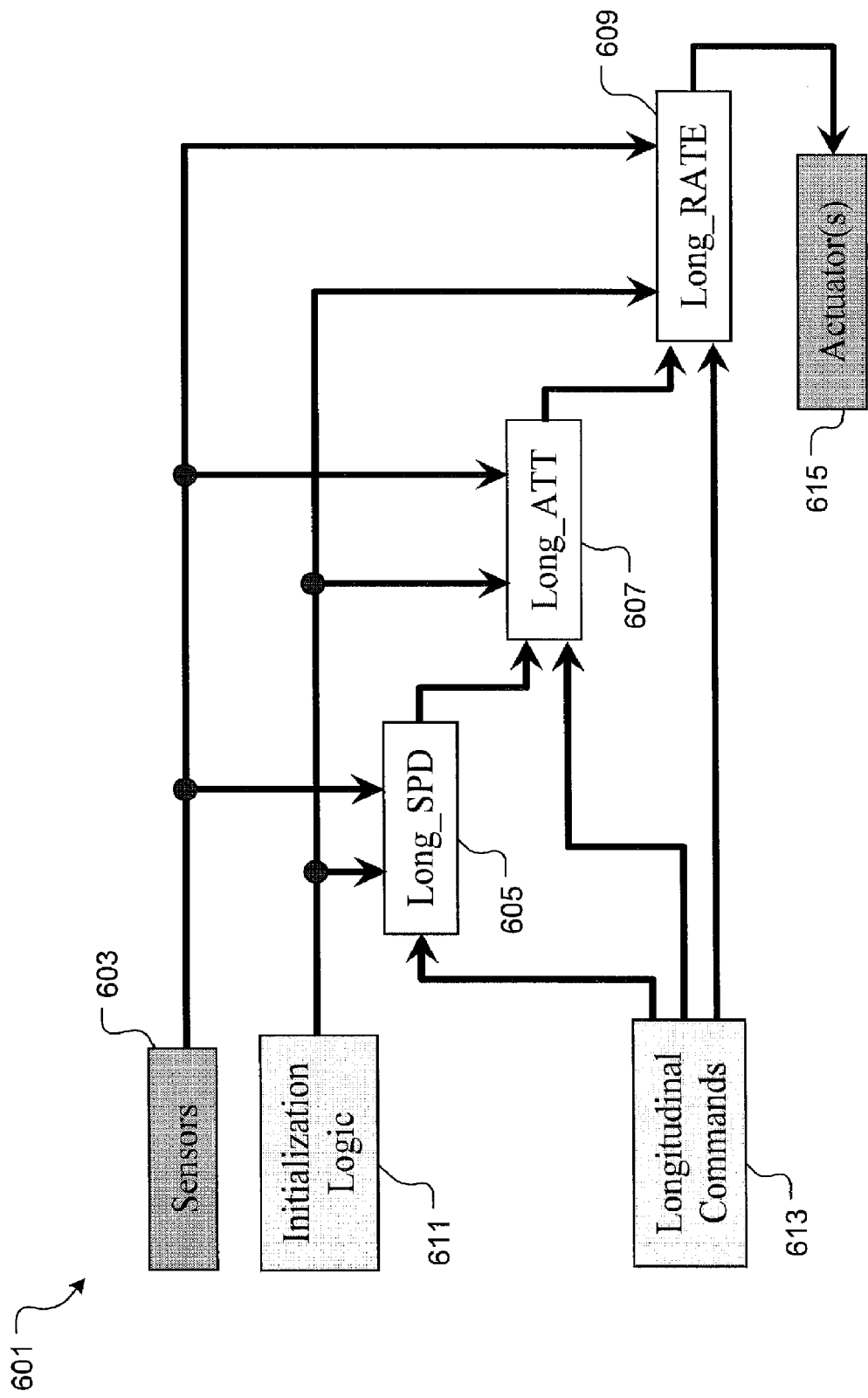
FIG. 6 is a schematic view of the control system architecture for a set of longitudinal control laws.
Figure 7:
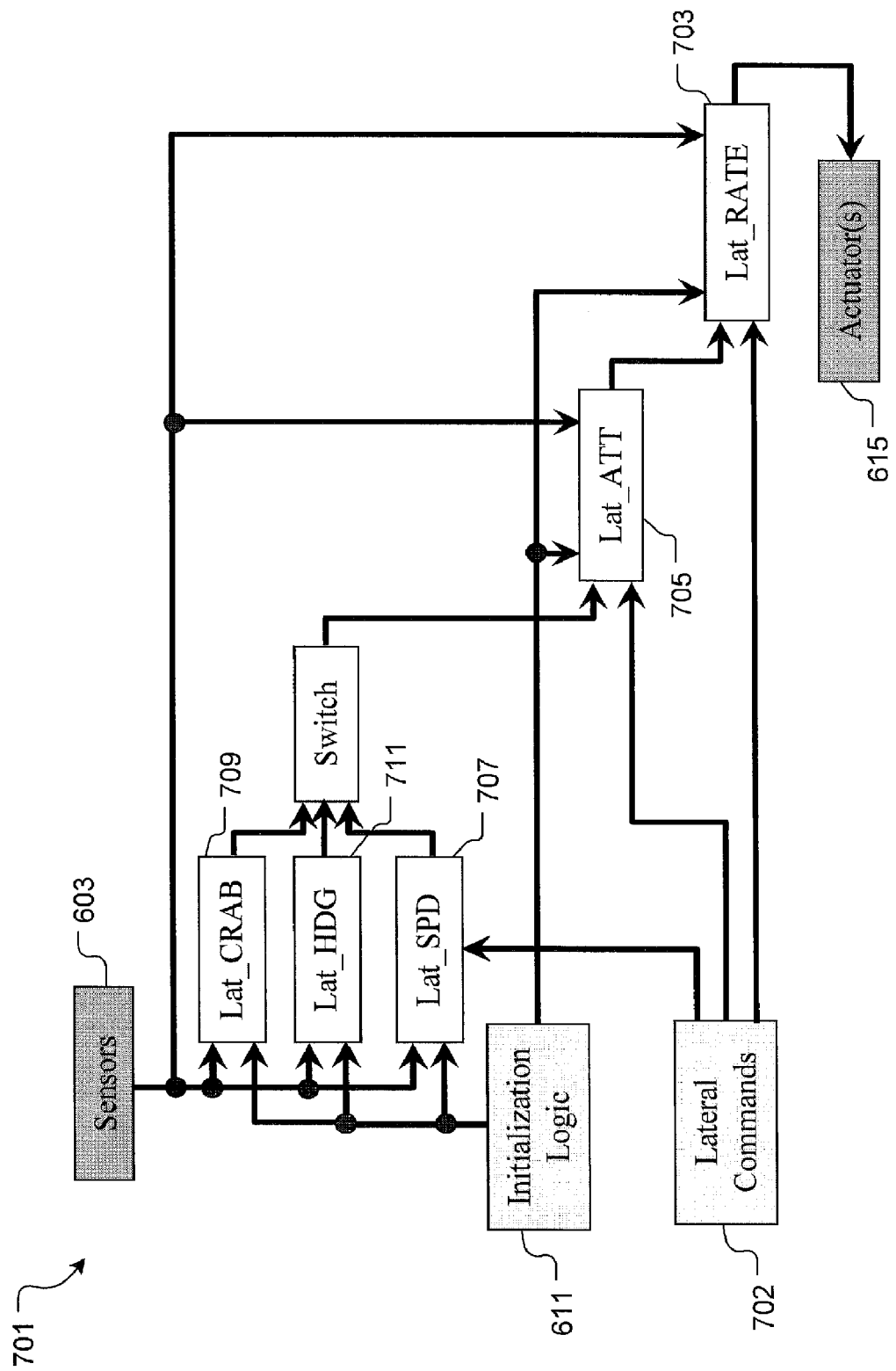
FIG. 7 is a schematic view of the control system architecture for a set of lateral control laws.
Figure 8:
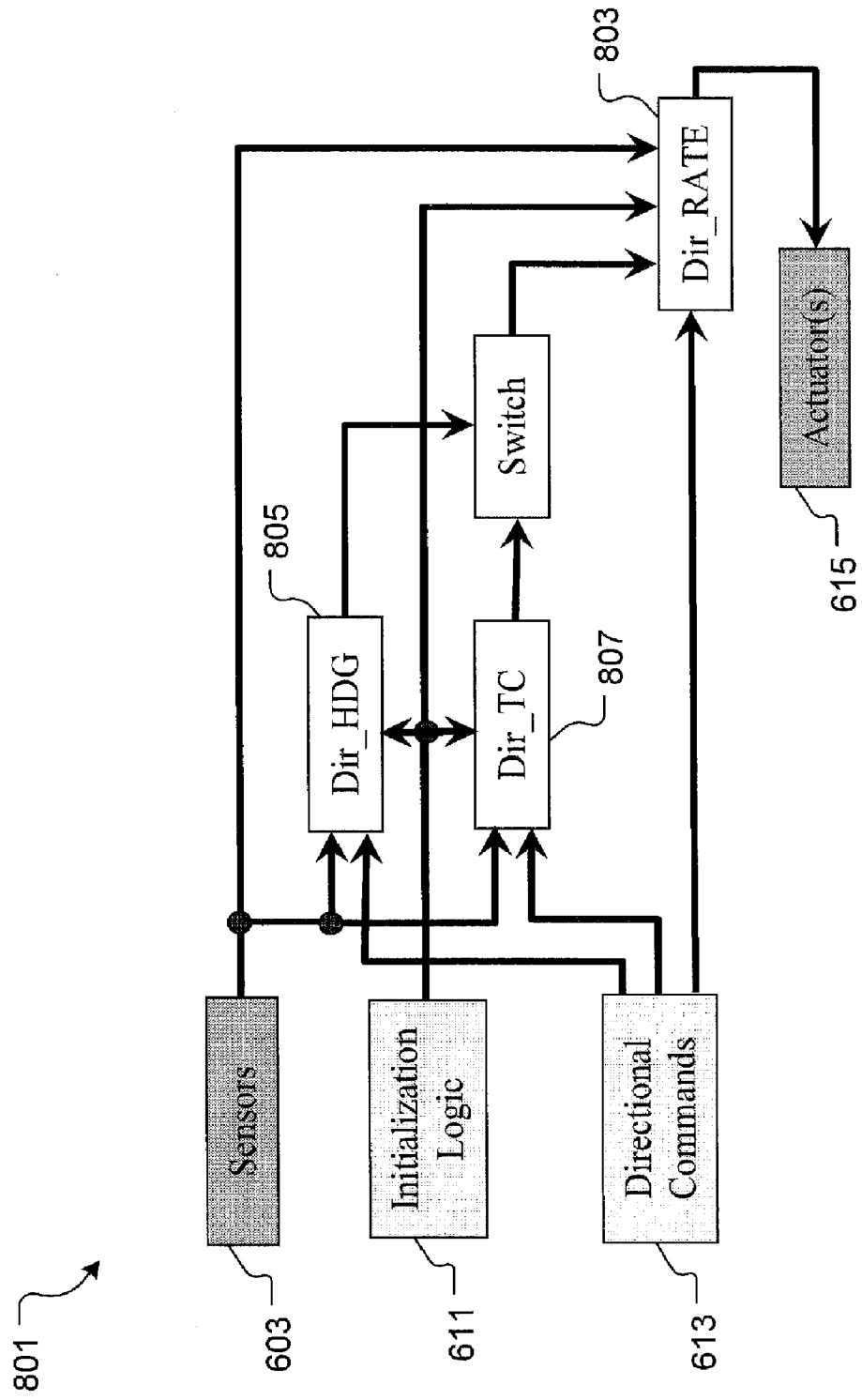
FIG. 8 is a schematic view of the control system architecture for directional control laws.

The key to enabling seamless and transient free GRM lies in the advanced control law architecture of the CVFT control system as shown in FIGS. 6 to 8. FIG. 6 shows architecture 601 of the CVFT control system operably associated with one or more longitudinal control laws, FIG. 7 shows architecture 701 of the CVFT control system operably associated with one or more lateral control laws, and FIG. 8 shows architecture 801 of the CVFT control system operably associated with one or more directional control laws according to the preferred embodiment of the invention.

Referring now to FIG. 6 in the drawings, architecture 601 includes one or more aircraft sensors 603 operably associated with the control laws to accomplish GRM. Aircraft sensors 603 can include: an inertial Navigation System (attitudes, attitude rates, and translational accelerations); a Global Positioning System (ground-referenced speeds and positions); an Air Data Computer (airspeed and barometric altitude); and, a Radar or Laser Altimeter (above ground level (AGL) altitude). An aircraft model can be obtained from aerodynamics data and a group of linear models can be developed based on its airspeed from aircraft sensors 603. These linear models include both lateral and longitudinal equations of motion. Since the aircraft model matrices are large and contain coupling terms of lateral and longitudinal motions within the matrices, it is difficult to determine the best performance control gains for all at the same time. In order to overcome these issues, the linear model of aircraft performance is decoupled first. After the aircraft model is decoupled to lateral and longitudinal equations of motion, the effect of coupling terms between lateral and longitudinal motions can be reduced to a minimum, thus stabilizing the system.

In the preferred embodiment, architecture 601 preferably comprises of a longitudinal control law for forward speed, represented as block 605 "Long_SPD"; a longitudinal control law for pitch angle, represented as block 607 "Long_ATT";

and, a longitudinal control law for pitch rate, represented as block 609 "Long_RATE". Architecture 601 is further provided with initialization logic 611 adapted for determining which loop is active in each axis based on flight conditions and pilot control inputs. Logic 611 will also re-initialize inactive loops in order to eliminate control jumps when switching between the loops to provide seamless and transient free mode changes.

Architecture 601 further includes a longitudinal command 613 generated in the control laws by referencing the pilot's cockpit control input in each axis. The input to the control laws is the difference between the controller's present position and the centered, no force position, which is also referred to as the "detent" position. The control commands can also be generated by a beep switch located in the cockpit to command small and precise changes in aircraft state. The control laws process these control inputs to generate the appropriate aircraft response commands. These commands are then sent out to the control law guidance blocks to maneuver the aircraft. The control law outputs are routed to an actuator 615 for each dynamic axis. For a conventional helicopter, the control laws send control signals to the following actuators: longitudinal axis—main rotor longitudinal swashplate angle; lateral axis—main rotor lateral swashplate angle; vertical axis—main rotor collective pitch; and, directional axis—tail rotor collective pitch.

Since pitch rate is the fastest longitudinal state, Long_RATE 609 is the inner loop of the longitudinal control laws. Next, the Long_ATT 607 loop feeds the Long_RATE control law 609 loop to control pitch attitude. Finally, the Long_SPD control law 605 loop feeds the Long_ATT 607 loop to control forward speed.

When flying with the longitudinal controller in detent outside of the Hover Hold/TRC region 105, depicted in FIG. 1, the Long_SPD 605 loop will be active. At lower speeds, this loop will hold constant forward groundspeed, while at higher speeds, airspeed will be held. Once the pilot moves the longitudinal controller out of detent, the control laws can command either pitch attitude (Long_ATT 607) or pitch rate (Long_RATE 609).

Referring now to FIG. 7 in the drawings, architecture 701 comprises one or more lateral control laws operably associated with sensors 603, logic 611, lateral commands 702, and actuators 615. The lateral control laws include: a lateral control of roll rate, represented as block 703 "Lat_RATE"; a lateral control of the roll attitude, represented as block 705 "Lat_ATT"; a lateral control of sideward groundspeed, represented as block 707 "Lat_SPD"; a lateral control of the crab angle, represented as block 709 "Lat_CRAB"; and, lateral control of heading, represented as block 711 "Lat_HDG".

Similar to the longitudinal axis, Lat_RATE 703 is the inner loop of the lateral control laws and the Lat_ATT 705 loop feeds the Lat_RATE 703 loop to control roll attitude. The Lat_ATT 705 loop can be fed by one of three loops, Lat_SPD 707, Lat_CRAB 709, or Lat_HDG 711.

The crab angle used in the Lat_CRAB 709 loop is computed in the control laws using the following equation:

$$\eta = \tan^{-1}(V_y/V_x) \quad (1)$$

where $\eta$ is the crab angle, $V_y$ is the sideward groundspeed with right positive, and $V_x$ is the forward groundspeed. To avoid a singularity in Equation 1, $V_x$ is limited to be above the Hover Hold/TRC region 103.

When operating in the Ground-Coordinated Banked Turn (GCBT) envelope as shown by region 107 in FIG. 1, if both the lateral and directional controllers are in detent, lateral control law logic will hold crab angle through the Lat_CRAB 709 loop. If operating in the CVFT envelope, but not in the GCBT envelope, and the lateral and directional controllers are in detent, the control logic will hold sideward groundspeed constant with the Lat_SPD 707 loop. When operating at higher airspeeds with lateral and directional controllers in detent, the control logic will hold heading constant with the Lat_HDG 711 loop. When the pilot moves the lateral controller out of detent in any of these cases, the control laws can command either roll attitude (Lat_ATT 705) or roll rate (Lat_RATE 703).

Referring now to FIG. 8 in the drawings, architecture 801 comprises one or more directional control laws operably associated with sensors 603, logic 611, commands 613, and actuators 615. The directional control laws include: directional control of yaw rate, represented as block 803 "Dir_RATE"; directional control of heading, represented as block 805 "Dir_HDG"; and, directional turn coordination, represented as block 807 "Dir_TC"

Since yaw rate is the fastest directional state, Dir_RATE 803 is the inner loop of the directional control laws. This loop is fed by the Dir_HDG 805 loop to control aircraft heading at lower speeds. Unlike traditional control law designs, this invention includes an additional loop, parallel to the Dir_HDG 805 loop, to feed the Dir_RATE 803 inner loop. The Dir_TC 807 loop is used to coordinate banked turns throughout the flight envelope.

In the GCBT envelope 107 shown in FIG. 1, the Dir_TC 807 loop will control crab angle during banked turns. With no directional input, the Dir_TC 807 loop will hold crab angle at zero. Any directional control inputs during a GCBT will result in a change in crab angle in the appropriate direction. Additionally, if the aircraft is in the GCBT envelope, but above the CVFT envelope, directional controller inputs will command changes in crab angle through the Dir_TC 807 loop even in non-turning flight. In this case, once the directional controller is returned to detent, heading hold will be re-engaged (Dir_HDG 805 loop) and the crab angle will be held though the Lat_CRAB 709 loop.

When in the BCBT envelope, the Dir_TC 807 loop will automatically adjust yaw rate based on actual bank angle, true airspeed, and lateral acceleration in order to keep the slip ball centered. Any directional controller inputs in the BCBT envelope will command a change in lateral acceleration, which will subsequently result in sideslip away from the pedal input. Pedal inputs will also result in a slight roll in the direction of the input to provide lateral stability.

In the absence of lateral or directional control inputs while operating in either the GCBT or CVFT envelopes, the directional axis will hold heading through the Dir_HDG 805 loop. If the pilot moves the directional controller out of detent in the CVFT envelope with both the lateral and longitudinal controllers in detent, the directional control laws will command a yaw rate through the Dir_RATE 803 loop. In this case, the control laws will maintain a constant ground vector by using the Long_SPD 605 and Lat_SPD 707 loops.

During the CVFT, when the directional controller is first moved out of detent, the control laws will capture the aircraft's current groundspeed in the earth axis coordinate system. The control laws keep track of the difference between the aircraft's actual groundspeed and the captured groundspeed. This relative groundspeed difference is converted from the earth axis to the aircraft's body axis using the following equations:

$$\Delta V_x = \Delta V_{north} \cdot \cos\psi + \Delta V_{east} \cdot \sin\psi \quad (2)$$

$$\Delta V_y = \Delta V_{east} \cdot \cos\psi - \Delta V_{north} \cdot \sin\psi \quad (3)$$

where $\Delta V_x$ is the groundspeed difference in the body axis forward direction, $\Delta V_y$ is the groundspeed difference in the body axis sideward direction with right positive, $\Delta V_{north}$ is the groundspeed difference in the earth axis north direction, $\Delta V_{east}$ is the groundspeed difference in the earth axis east direction, and $\psi$ is the aircraft heading. The values for $\Delta V_x$ and $\Delta V_y$ are then used in the Long_SPD 605 and Lat_SPD 707 blocks respectively to command the pitch and roll attitudes needed to minimize the relative groundspeed difference during the flat turn.

Figure 9:
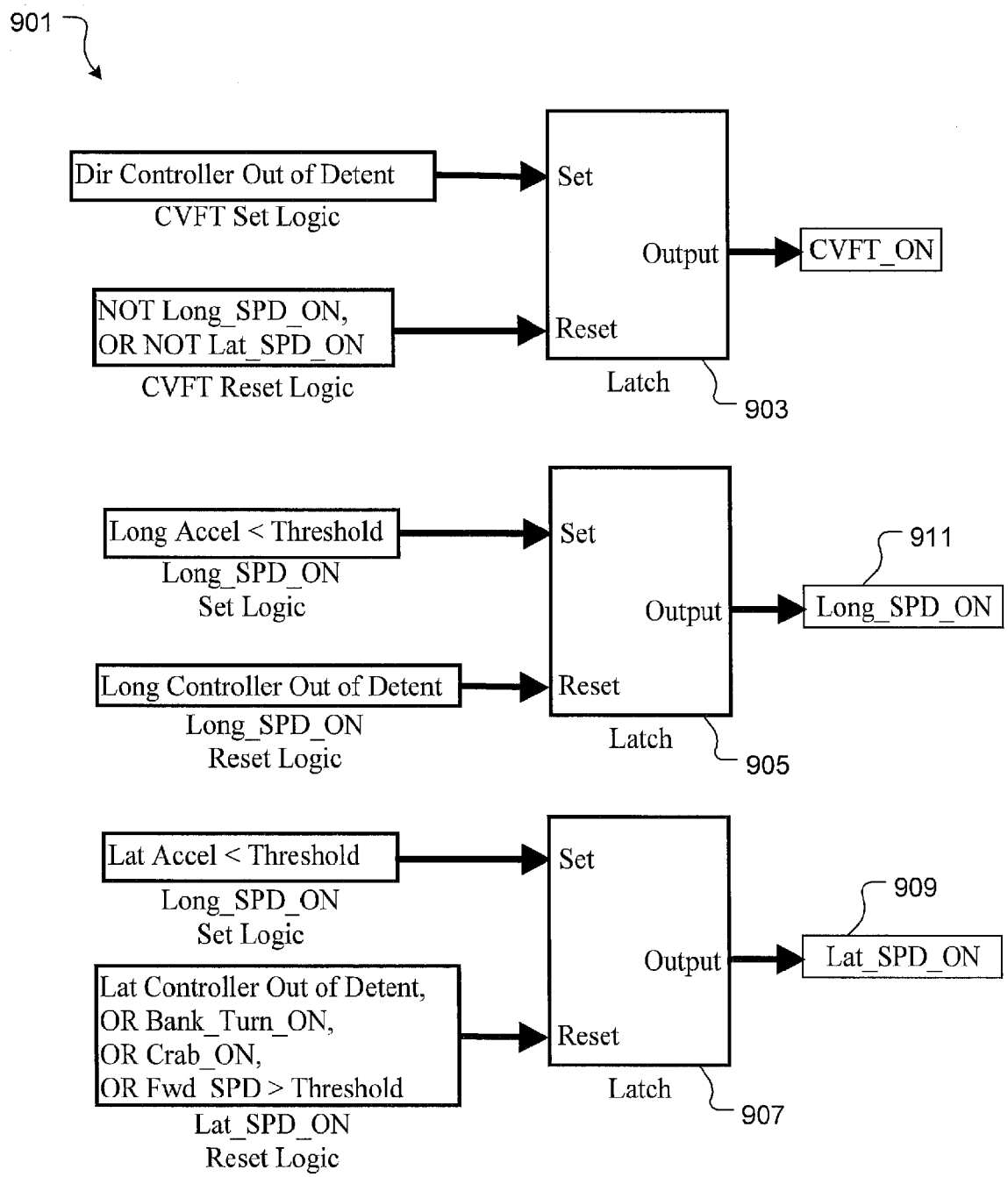
FIG. 9 is a schematic view of the control law logic for the control system.

Referring now to FIG. 9 in the drawings, control law logic 901 for the CVPT mode is shown. Control law logic 901 comprises one or more of latch 903, latch 905, and latch 907 adapted to control when a mode is turned on or off. If the reset conditions are met, then the mode will always be off. If the reset conditions are not met, then the mode will be latched on when the set conditions are met. The CVPT mode will be reset whenever lateral speed hold, depicted as block 909 "Lat_SPD_ON" or a longitudinal speed hold, depicted as block 911 "Long_SPD_ON" are not on and will be set when the directional controller is out of detent.

Both longitudinal speed hold latch 905 and lateral speed hold latch 907 will be reset when their respective controller is out of detent. Additionally, the lateral speed hold latch 907 will be reset when the banked turn (Bank_Turn_ON) or crab hold (Crab_ON) modes are on, or if forward speed exceeds the CVPT threshold (typically around 35 KGS). The longitudinal and lateral speed hold latches will be set when their respective acceleration falls below the acceleration threshold (typically around 2 ft/sec$^2$).

Figure 10:
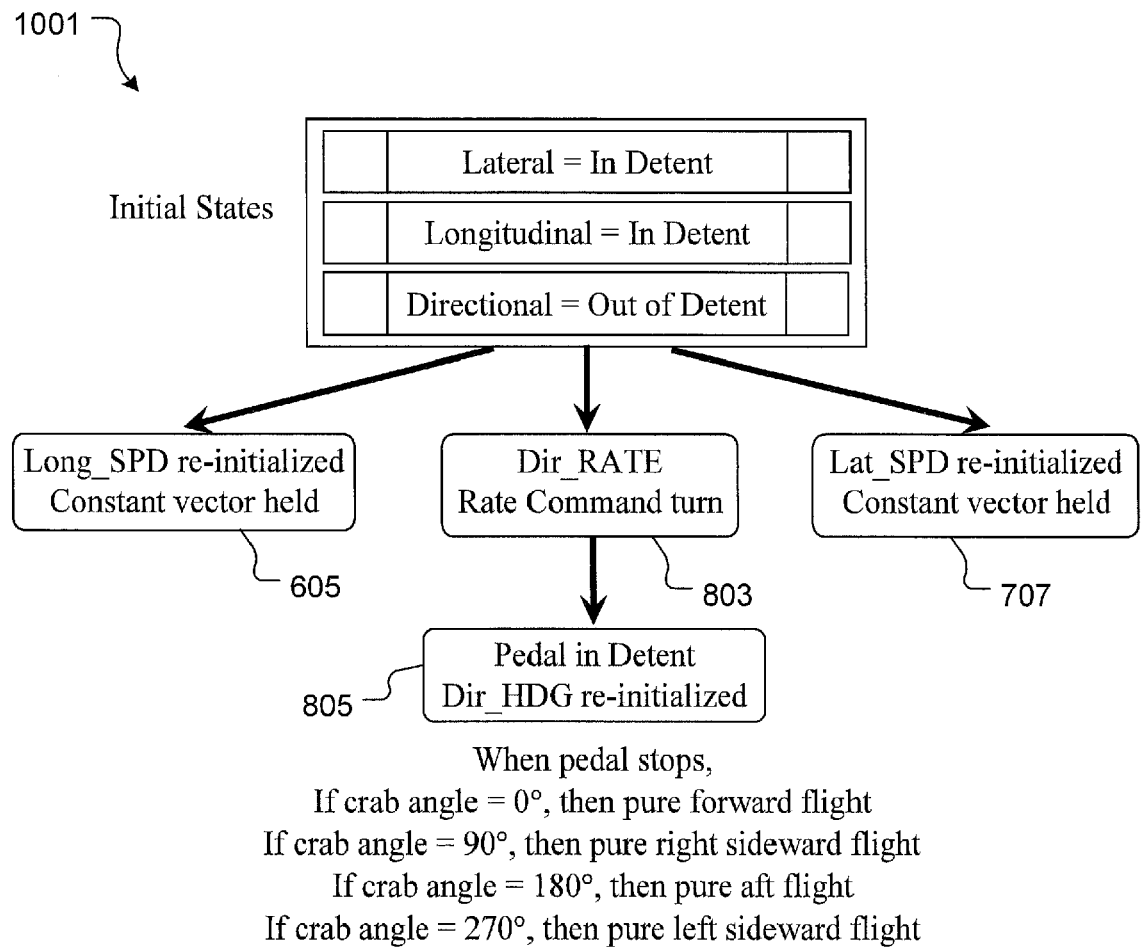
FIG. 10 is a schematic view a control law flow chart for the control system.

Referring now to FIG. 10 in the drawings, a control law flow chart 1001 for a CVFT is presented. When the directional controller is initially moved out of detent, the CVPT mode will be engaged. The longitudinal and lateral speed hold blocks (Long_SPD 605 and Lat_SPD 707) will be reinitialized to feedback the relative groundspeed differences calculated in equations 2 and 3. Once the directional controller is returned to detent following the CVFT, directional control laws will hold heading by re-engaging the Dir_HDG 805 loop. The longitudinal and lateral axes will continue to hold a constant ground vector until the pilot commands a change by moving either the longitudinal or lateral controller out of detent. This design enables the pilot to command and hold any crab angle around the 360 degree circle, while the aircraft continues to move across the ground on a constant vector. As shown, when the pedal stops, if the crab angle equals 0 degrees, then aircraft 201 travels in pure forward flight; if the crab angle is 90 degrees, aircraft 201 travels in pure right side flight; if the crab angle is 180 degrees, then aircraft 201 travels in pure aft flight; and, if the crab angle is 270 degrees, then aircraft 201 travels in pure left sideward flight.

The particular embodiments disclosed above are illustrative only, as the invention may be modified and practiced in different but equivalent manners apparent to those skilled in the art having the benefit of the teachings herein. It is therefore evident that the particular embodiments disclosed above may be altered or modified, and all such variations are considered within the scope and spirit of the invention. Accordingly, the protection sought herein is as set forth in the description. It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. An aircraft, comprising:
a sensor carried by the aircraft, the sensor being adapted to sense a directional movement of the aircraft;
an actuator carried by the aircraft, the actuator being utilized to control the directional movement of the aircraft; and
a control system in data communication with the aircraft sensor and operably associated with the actuator, the control system having:
a model adapted to decouple the directional movement of the aircraft into a lateral equation of motion and a longitudinal equation of motion;
a lateral control architecture in data communication with the model, the lateral control architecture being adapted to utilize the lateral equation of motion to control the lateral motion of the aircraft;
a longitudinal control architecture in data communication with the model, the longitudinal control architecture adapted to utilize the longitudinal equation of motion to control the longitudinal motion of the aircraft; and
an initialization command logic in data communication with the lateral control architecture and in data communication with the longitudinal control architecture;
wherein the initialization command logic selectively activates the lateral control architecture for controlling the lateral motion of the aircraft and selectively activates the longitudinal control architecture for controlling the longitudinal motion of the aircraft; and
wherein the control system utilizes the lateral control architecture and the longitudinal control architecture to control speed variations of the aircraft while the aircraft maintains a constant vector heading across a ground surface.

2. The aircraft of claim 1, the aircraft further comprising:
a directional controller, the directional controller being manipulated by a pilot controlling the aircraft, the directional controller being in data communication with the control system.

3. The aircraft of claim 2, the directional control architecture comprising:
a directional heading control loop;
a directional turn coordination control loop; and
a directional yaw rate control loop.

4. The aircraft of claim 2, further comprising:
a directional control latch in data communication with the directional control architecture;
wherein, as the directional controller is moved out of a detent position, the directional control latch activates a constant vector flat turn motion.

5. The aircraft of claim 1, the lateral control architecture comprising:
a lateral sideward groundspeed control loop;
a lateral roll attitude control loop; and
a lateral roll rate control loop.

6. The aircraft of claim 5, further comprising:
a lateral controller carried by the aircraft, the lateral controller being manipulated by a pilot controlling the aircraft, the lateral controller creating a lateral command in data communication with the lateral sideward groundspeed control loop, the lateral roll attitude control loop, and the lateral roll rate control loop.

7. The aircraft of claim 6, further comprising:
a lateral control latch in data communication with the control system;

wherein, as the lateral controller is moved out of a detent position, the lateral control latch resets a lateral speed hold.

8. The aircraft of claim 1, the longitudinal control architecture comprising:
a longitudinal forward speed control loop;
a longitudinal pitch angle control loop; and
a longitudinal pitch rate control loop.

9. The aircraft of claim 8, the longitudinal control architecture further comprising:
a longitudinal controller carried by the aircraft, the longitudinal controller being manipulated by a pilot controlling the aircraft, the longitudinal controller creating a longitudinal command in data communication with the longitudinal forward speed control loop, the longitudinal pitch angle control loop, and the longitudinal pitch rate control loop.

10. The aircraft of claim 9, further comprising:
a longitudinal control latch in data communication with the control system;
wherein, as the longitudinal controller is moved out of a detent position, the longitudinal control latch resets a longitudinal speed hold.

11. A method to control flat yawing turns of an aircraft while maintaining a constant vector heading across a ground surface, the method comprising:
sensing the speed variation of the aircraft with a sensor carried by the aircraft, the speed variation having:
a longitudinal direction of motion; and
a lateral direction of motion;
controlling the speed variation of the aircraft with actuators operably associated with the aircraft;
providing a control system in data communication with the aircraft sensor and operably associated with the actuators, the control system having:
a model;
a lateral control architecture;
a longitudinal control architecture; and
an initialization command logic in data communication with the lateral control architecture and in data communication with the longitudinal control architecture;
decoupling the directional movement of the aircraft into the lateral equation of motion and the longitudinal equation of motion with the model;
controlling the lateral direction of motion with a lateral control architecture, the lateral control architecture utilizing the lateral equation of motion;
controlling the longitudinal direction of motion with a longitudinal control architecture, the longitudinal control architecture utilizing the longitudinal equation of motion; and
selectively activating the lateral control architecture and the longitudinal control architecture with the initialization command logic;
wherein the control system receives sensed speed variation data from the sensor and operably controls the actuators, thus providing selective control of the yawing turns of the aircraft while maintaining a constant vector across a ground surface.

12. The method of claim 11, the method further comprising:
commanding the flat yawing turns with a directional controller manipulated by a pilot controlling the aircraft, the directional controller being operably associated with a directional control architecture, the directional control architecture being in data communication with the control system.

13. The method of claim 12, wherein the commanding of the flat yawing turns with the directional control architecture comprises:
communicating data through a directional heading control loop;
communicating data through a directional turn coordination control loop; and
communicating data through a directional yaw rate control loop.

14. The method of claim 12, further comprising:
activating the constant vector flat turn with a directional control latch as the directional controller is moved out of a detent position, the directional control latch being operably associated with the directional control architecture.

15. The method of claim 11, wherein controlling the lateral direction of motion with the lateral control architecture comprises:
communicating lateral motion data through a lateral sideward groundspeed control loop;
communicating lateral motion data through a lateral roll attitude control loop; and
communicating lateral motion data through a lateral roll rate control loop.

16. The method of claim 11, further comprising:
controlling the lateral direction of motion with a lateral controller manipulated by a pilot controlling the aircraft, the lateral controller being operably associated with the lateral control architecture.

17. The aircraft of claim 16, further comprising:
resetting a lateral speed hold with a lateral control latch as the lateral controller is moved out of a detent position, the lateral control latch being in data communication with the lateral control architecture.

18. The method of claim 17, wherein controlling the longitudinal direction of motion with the longitudinal control architecture comprises:
communicating longitudinal motion data through a longitudinal forward speed control loop;
communicating longitudinal motion data through a longitudinal pitch angle control loop; and
communicating longitudinal motion data through a longitudinal pitch rate control loop.

19. The aircraft of claim 11, the longitudinal control architecture further comprising:
controlling the longitudinal direction of motion with a longitudinal controller manipulated by a pilot controlling the aircraft, the longitudinal controller being operably associated with the longitudinal control architecture.

20. The aircraft of claim 19, further comprising:
resetting a longitudinal speed hold with a longitudinal control latch as the longitudinal controller is moved out of a detent position, the longitudinal control latch being in data communication with the longitudinal control architecture.

* * * * *